(12) United States Patent
Ujibashi et al.

(10) Patent No.: US 8,539,495 B2
(45) Date of Patent: Sep. 17, 2013

(54) RECORDING MEDIUM STORING THEREIN A DYNAMIC JOB SCHEDULING PROGRAM, JOB SCHEDULING APPARATUS, AND JOB SCHEDULING METHOD

(75) Inventors: Yoshifumi Ujibashi, Kawasaki (JP); Kouichi Kumon, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 326 days.

(21) Appl. No.: 13/018,917

(22) Filed: Feb. 1, 2011

(65) Prior Publication Data
US 2011/0191779 A1 Aug. 4, 2011

(30) Foreign Application Priority Data
Mar. 2, 2010 (JP) ................... 2010-45436

(51) Int. Cl.
*G06F 9/46* (2006.01)
(52) U.S. Cl.
USPC ......................................... 718/103; 718/102
(58) Field of Classification Search
USPC .................................................. 718/102, 103
See application file for complete search history.

(56) References Cited

U.S. PATENT DOCUMENTS

| | | | | |
|---|---|---|---|---|
| 6,662,203 B1 * | 12/2003 | Kling et al. | ................... | 718/103 |
| 7,437,446 B2 * | 10/2008 | Bailey et al. | ................... | 709/223 |
| 7,562,362 B1 * | 7/2009 | Paquette et al. | ................ | 718/102 |
| 7,565,652 B2 * | 7/2009 | Janssen et al. | ................. | 718/103 |
| 8,112,754 B2 * | 2/2012 | Shikano | ......................... | 718/102 |
| 8,166,483 B2 * | 4/2012 | Chrabieh | ....................... | 718/103 |
| 8,281,007 B2 * | 10/2012 | Goto et al. | ..................... | 709/225 |
| 8,365,177 B2 * | 1/2013 | Chan et al. | ..................... | 718/103 |
| 2003/0037091 A1 * | 2/2003 | Nishimura et al. | ........... | 709/103 |
| 2005/0278520 A1 * | 12/2005 | Hirai et al. | ........................ | 713/1 |
| 2006/0242642 A1 * | 10/2006 | Yamamura et al. | .......... | 718/100 |
| 2008/0229318 A1 * | 9/2008 | Franke | ........................... | 718/104 |
| 2009/0288090 A1 * | 11/2009 | Ujibashi et al. | ............... | 718/103 |

FOREIGN PATENT DOCUMENTS

JP 2009-277041 11/2009

* cited by examiner

*Primary Examiner* — Van Nguyen
(74) *Attorney, Agent, or Firm* — Staas & Halsey LLP

(57) ABSTRACT

A job scheduling apparatus determines an assignment order, which is the order in which jobs are assigned to a computational resource, on the basis of priority levels and being associated with the assignment order. The apparatus assigns the jobs to the computational resource on the basis of the assignment order. The apparatus reduces the priority levels for the jobs that have been assigned to the computational resource. The apparatus increases the priority levels with time. Regarding a priority level among the priority levels, if, at a future time, which is a fixed time period from the start of execution of the jobs, an amount of an increase in the priority level is expected to be equal to or larger than an amount of a reduction in the priority level for a job, assignment of the job to the computational resource is executed.

17 Claims, 12 Drawing Sheets

RECORDING MEDIUM STORING THEREIN A DYNAMIC JOB SCHEDULING PROGRAM, JOB SCHEDULING APPARATUS, AND JOB SCHEDULING METHOD

CROSS-REFERENCE TO RELATED APPLICATIONS

This application is based upon and claims the benefit of priority of the prior Japanese Patent Application No. 2010-45436, filed on Mar. 2, 2010, the entire contents of which are incorporated herein by reference.

FIELD

The embodiments discussed herein are related to job scheduling.

BACKGROUND

Hitherto, jobs (for example, computations, several days being taken to complete the computations) that are associated with science and technologies or the like and that place high computing loads have been executed utilizing parallel supercomputers disposed in computer centers or the like, computer clusters, or the like (hereinafter, referred to as a "computational resource"). Typically, such a computational resource is shared with a plurality of users (for example, tens of researchers). Accordingly, in order to assign the limited computational resource to the individual users with fairness, it is necessary to appropriately schedule execution of jobs that are submitted by the individual users.

Such execution of jobs is typically executed as follows: (1) users submit jobs in a job queue of a job scheduler; (2) the job scheduler executes a scheduling process of dispatching the jobs on the basis of the order of priority levels of the individual jobs, and this process is executed until no job is left in the job queue or until no computational resource that can be assigned is left; and (3) when a trigger with which a job in the job queue can be dispatched is generated by submitting a new job with a user, by termination of a job, or the like, the job scheduler executes the scheduling process.

Here, when jobs are submitted, basically, priority levels of the individual jobs are determined on the basis of an submitting order, which is the order in which the jobs are submitted, or on the basis of priority levels of users who own the jobs. Note that priority levels of users are priority levels that are determined among the users, and are different from priority levels of jobs. Priority levels of jobs are priority levels that are determined among jobs that belong to the same user.

However, when a dispatch order is determined only on the basis of priority levels of jobs that have been determined when the jobs have been submitted, a phenomenon occurs, in which a computational resource is occupied by a user for which a high priority level is set or by a large amount of jobs that have previously been submitted by a certain user. In order to prevent a computational resource from being occupied by such one user, a typical job scheduler has a fair sharing function.

For example, fairness in assignment of a computational resource is maintained by dynamically changing priority levels of users as illustrated in FIG. 1.

The priority levels of users that dynamically change are referred to as "dynamic priority levels". For each user, a static priority level is set in accordance with the degree of importance of the user. The static priority level is determined on the basis of an utilizable capacity, which is determined for each user, (for example, which is represented by an expression of the number of central processing units (CPUs)×a time) of a computational resource per fixed time period (for example, one year).

When a job is dispatched and execution of the job with a computational resource starts (at a time at which the job starts), a state in which a penalty is imposed is set for a user associated with the job. In other words, as illustrated in FIG. 1, in response to the start of execution of the job, the dynamic priority level of the user associated with the job decreases by an estimated utilization capacity (for example, which is represented by an expression of the number of utilized CPUs×a fixed time (an estimated execution time in the embodiments), hereinafter, simply referred to as an "estimated utilization capacity") of the computational resource for the job. In the state in which a penalty is imposed, the dynamic priority level of the user decreases relative to the priority levels of the other users, and the place of the job in a dispatch order, which is the order in which jobs are dispatched, is moved down the order. Note that the estimated utilization capacity is set by the user when the job is submitted. The estimated execution time is a time taken to terminate the job. The number of utilized CPUs is the number of CPUs that the user utilizes.

After a penalty is imposed (after the dynamic priority level is reduced) in response to the start of execution of the job, the dynamic priority level of the user associated with the job gradually recovers with time using a recovery rate that is determined in accordance with the utilizable capacity of the computational resource per fixed time period. Accordingly, the number of penalties can be reduced at an earlier time for a user to which a larger utilizable capacity of the computational resource per fixed time period is set. Referring to FIG. 1, the dynamic priority level linearly increases in a period from a time at which a job starts to a time at which a job finishes. Note that the maximum value of the dynamic priority level is the static priority level. Accordingly, after the dynamic priority level has reached the static priority level, the dynamic priority level does not further increase.

In the scheme illustrated in FIG. 1, a utilizable capacity of a computational resource per fixed time period is set for each user, and, regarding a job associated with a user who has utilized the computational resource so that the utilized capacity of the computational resource exceeds the utilizable capacity, the place of the job in a dispatch order is moved down the order (that is, even when the fixed time period has elapsed, the dynamic priority level of the user cannot reach the static priority level although the dynamic priority level of the user is recovered). Accordingly, the fair sharing function can be realized (dynamic priority levels can be adjusted) so that the computational resource can be utilized with fairness within a range in which individual users are allowed to utilize the computational resource.

However, in an environment in which a scheme for controlling dynamic priority levels such as the scheme illustrated in FIG. 1 is realized, a case is supposed, in which a large amount of job associated with a certain user (hereinafter, referred to as a "user A") is submitted in a state in which a large amount of free capacity of a computational resource (free capacity of a CPU) exists. In this case, because no jobs associated with the other users exist, there is a possibility that the large amount of job associated with the user A is executed even in a state in which a large number of penalties are impose on the user A.

As a result, the dynamic priority level of the user A changes as illustrated below. FIG. 2 is a graph illustrating an example of changes in dynamic priority levels in a case in which a large amount of job associated with a specific user is submitted.

Referring to FIG. 2, the dynamic priority level of the user A decreases at times a, b, c, d, e, and f. The reason for this is that jobs associated with the user A are dispatched at the individual times. As a result, the dynamic priority level of the user A markedly decreases, and a state in which the dynamic priority level of the user A will not recover for a while is illustrated. Accordingly, when jobs are submitted by other users, there is a possibility that a state in which the places of the jobs associated with the other users jump over the place of a job associated with the user A in a dispatch order continues for a long time.

However, submitting of a job in a state in which a free capacity of a computational resource exists leads to effective utilization of the computational resource. Thus, it can be considered that imposing of a penalty such as the above-described penalty on a user who has utilized a computational resource in an ideal manner is terrible. Accordingly, it can be considered that it is appropriate to provide some remedial means for the user.

SUMMARY

A job scheduling apparatus determines an assignment order, which is the order in which jobs are assigned to a computational resource, on the basis of priority levels, for example, the priority levels being recorded in computer readable storage medium, and being associated with the assignment order. The apparatus assigns the jobs to the computational resource on the basis of the assignment order. The apparatus reduces the priority levels for the jobs that have been assigned to the computational resource. The apparatus increases the priority levels with time. Regarding a priority level among the priority levels, if, at a future time, which is a fixed time period from the start of execution of the jobs, an amount of an increase in the priority level is expected to be equal to or larger than an amount of a reduction in the priority level for a job, assignment of the job to the computational resource is executed.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
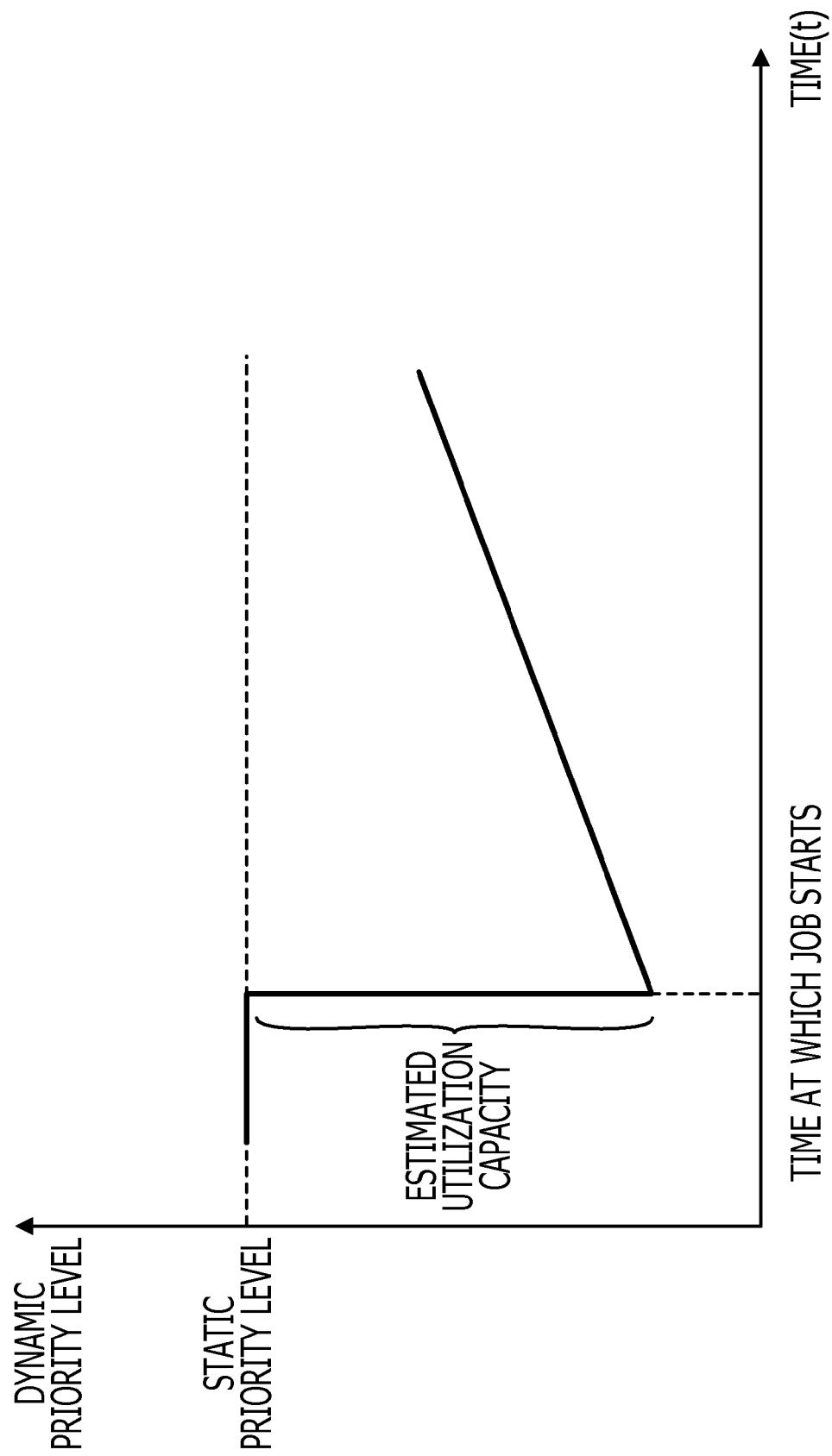
FIG. 1 is a graph illustrating an example of change in the priority level of a user.
Figure 2:
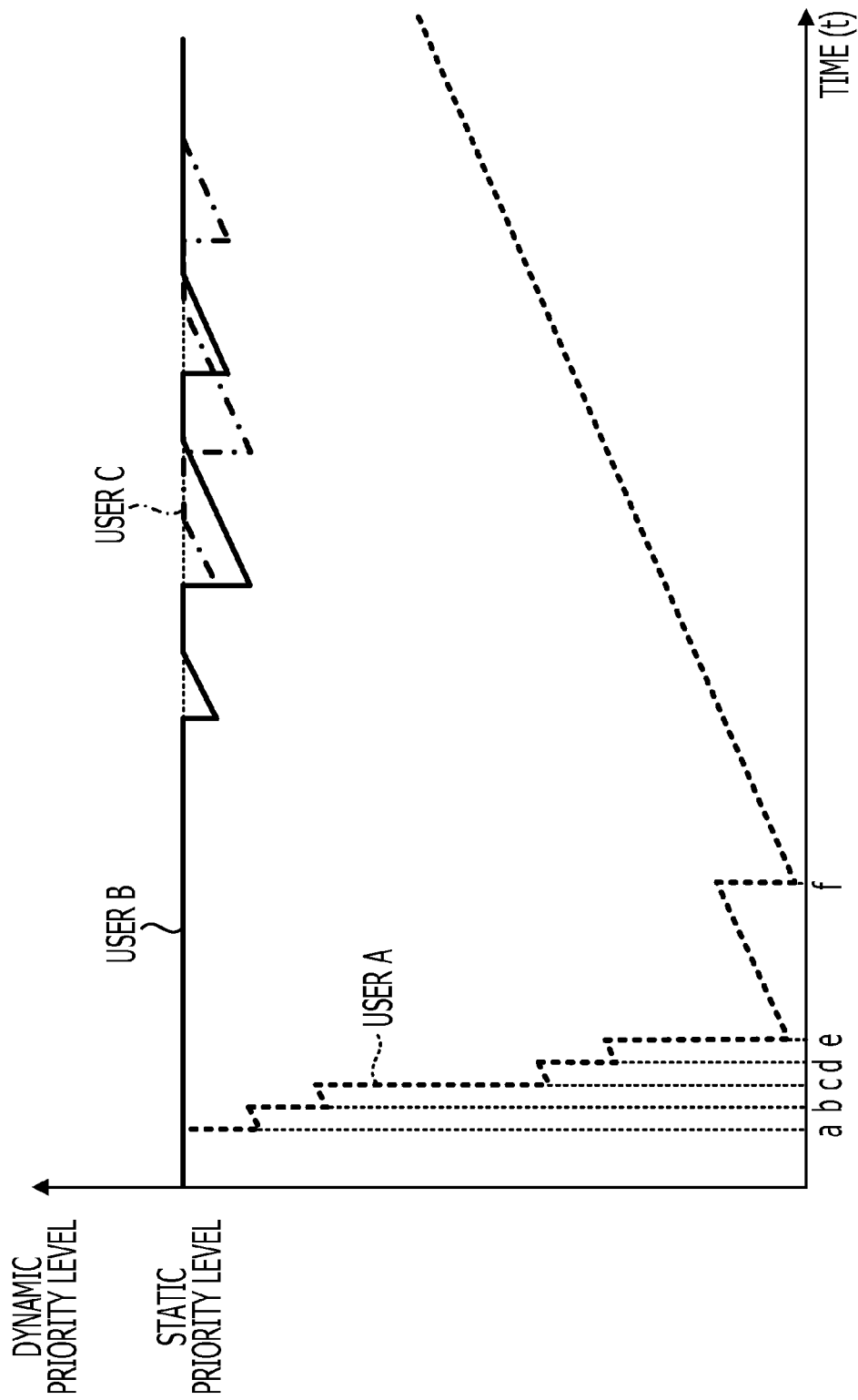
FIG. 2 is a graph illustrating an example of changes in dynamic priority levels in a case in which a large amount of job associated with a specific user is submitted.
Figure 3:
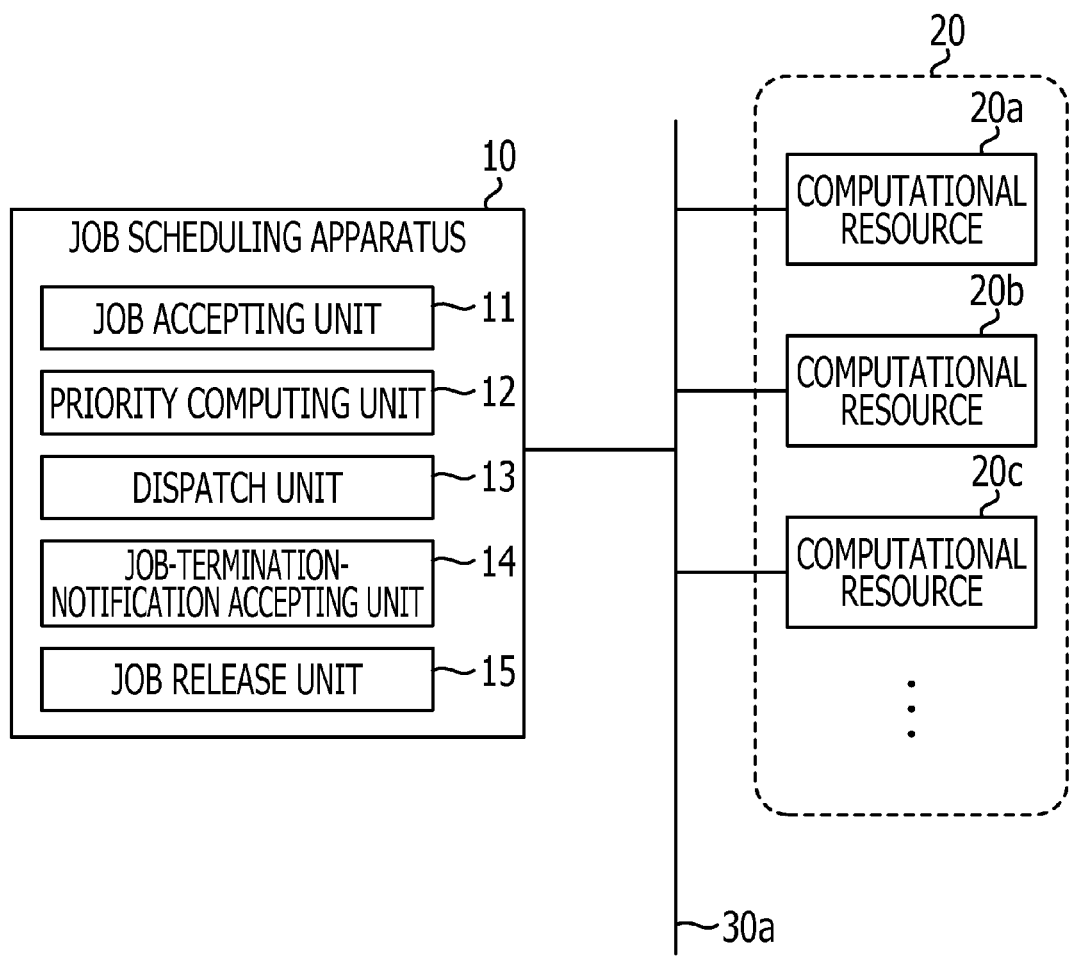
FIG. 3 is a diagram illustrating an example of a configuration of a computing system in an embodiment of the present invention.

FIG. 3 is a diagram illustrating an example of a configuration of a computing system in an embodiment of the present invention. Referring to FIG. 3, a job scheduling apparatus 10 and at least one computational resource 20 are coupled via a network 30 such as a local area network (LAN) (although whether or not the network 30 is a wired or wireless network does not matter).

The job scheduling apparatus 10 is a computer that accepts submitions of jobs from users, that controls an assignment (dispatch) order, which is the order in which the submitting jobs are assigned (dispatched) to the computational resource 20, that dispatches the jobs, and so forth. The job scheduling apparatus 10 includes a job accepting unit 11, a priority computing unit 12, a dispatch unit 13, a job-termination-notification accepting unit 14, a job release unit 15, and so forth. A program installed in the job scheduling apparatus 10 causes a CPU of the job scheduling apparatus 10 to execute processes, and these units are realized by the processes.

Although the term "user" may refer to a group constituted by a plurality of users, hereinafter, for convenience of description, the term "user" is used as a unified expression.

The job accepting unit 11 accepts a submition of a job. The priority computing unit 12 executes computation of a dynamic priority level, which is described below, and so forth. The dispatch unit 13 is an example of assignment unit, and dispatches (assigns) a job to the computational resource 20. The job-termination-notification accepting unit 14 receives a termination notification regarding a job from the computational resource 20. The job release unit 15 executes a releasing process associated with a job regarding which a termination notification has been received.

The computational resource 20 is a computational resource that executes a job which has been assigned (dispatched), and, for example, corresponds to a parallel supercomputer, a computer cluster, or the like. In other words, computational resources 20a, 20b, and 20c that are illustrated in FIG. 3 by way of examples do not necessarily need to be single computers, and may be a plurality of computers that are coupled using an interconnection network. Furthermore, each of the computational resources 20a to 20c may be interpreted as a single CPU or a plurality of CPUs.

Figure 4:
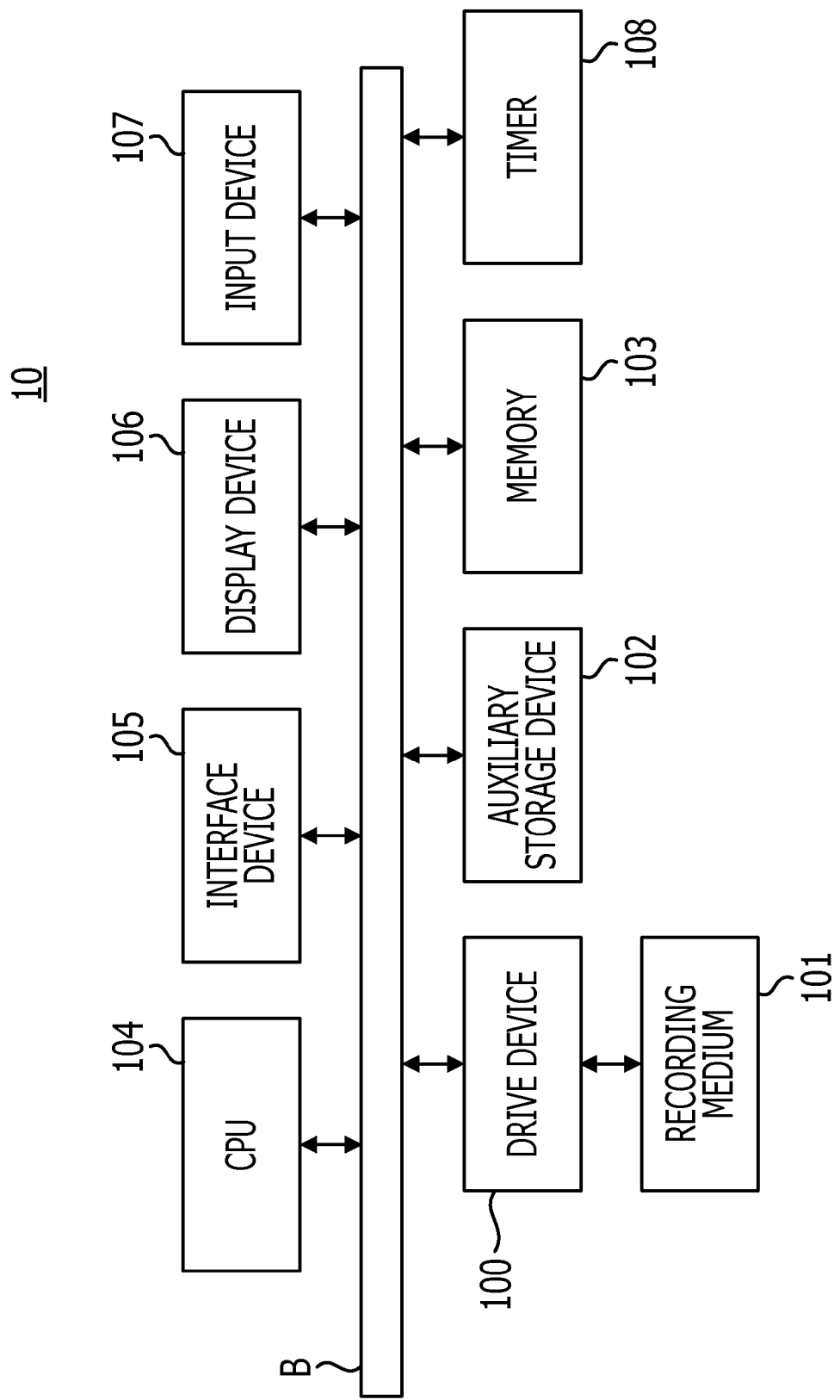
FIG. 4 is a diagram illustrating an example of a hardware configuration of a job scheduling apparatus according to the embodiment of the present invention.

FIG. 4 is a diagram illustrating an example of a hardware configuration of the job scheduling apparatus according to the embodiment of the present invention. The job scheduling apparatus 10 illustrated in FIG. 4 includes a drive device 100, an auxiliary storage device 102, a memory 103, a CPU 104, an interface device 105, a display device 106, an input device 107, a timer 108, and so forth which are coupled to each other using a bus B.

The program that realizes processes in the job scheduling apparatus 10 is supplied from the recording medium 101 which is a computer-readable, non-transitory medium such as a compact disc read-only memory (CD-ROM). When the recording medium 101 on which the program is recorded is set in the drive device 100, the program is installed in the auxiliary storage device 102 from the recording medium 101 via the drive device 100. The auxiliary storage device 102 stores the installed program, and stores necessary files, data, and so forth.

When an instruction for activating the program is provided, the memory 103 reads the program from the auxiliary storage device 102, and stores the program. The CPU 104 realizes functions associated with the job scheduling apparatus 10 in accordance with the program that has been stored in the memory 103. The interface device 105 is used as an interface for establishing connection with a network. The display device 106 displays a graphical user interface (GUI) that is provided by the program or the like. The input device 107 is configured using a keyboard, a mouse, and so forth, and is used to submit various types of operation instructions. The timer 108 is a clock.

Note that installation of the program does not necessarily need to be executed using the recording medium 101, and may be downloaded from other computers via networks.

Next, an outline of a scheme for controlling priority levels in a first embodiment will be described. In the scheme for controlling priority levels in the first embodiment, priority levels that are used to determine a dispatch order (an execution order), which is the order in which jobs associated with the individual users are dispatched (executed), and that are determined on a user-by-user basis dynamically change. Hereinafter, such priority levels are referred to as "dynamic priority levels". In contrast, static priority levels are set for the individual users in advance in accordance with the degrees of importance of the users. A utilizable capacity (for example, which is represented by an expression of the number of CPUs×a time) of the computational resource 20 per fixed time period (for example, one year) is determined for each of the users, and a corresponding one of the static priority levels is determined on the basis of the utilizable capacity of the computational resource 20. However, a common value may be applied to the static priority levels of all of the users.

Each of the dynamic priority levels decreases (a penalty is imposed) by an estimated utilization capacity (for example, which is an expression of the number of CPUs×an estimated execution time, hereinafter, simply referred to as an "estimated utilization capacity") of the computational resource 20 for a job that has been dispatched. After a penalty is imposed (the dynamic priority level is reduced), the dynamic priority level of a user associated with the job gradually recovers (increases) with time using a recovery rate that is determined in accordance with the utilizable capacity of the computational resource 20 per fixed time period. It is supposed that the maximum value of each of the dynamic priority levels is a corresponding one of the static priority levels. Accordingly, after each of the dynamic priority levels reaches a corresponding one of the static priority levels, the dynamic priority level will not further increase.

Note that, when the static priority levels and the dynamic priority levels are not distinguished from each other, the static and dynamic priority levels are simply referred to as "priority levels" of users. In the present embodiment, it can be supposed that a maximum value of each of the priority levels is "0". However, because the priority level is a relative index, the absolute value of the priority level does not have any particular meaning.

Figure 5:
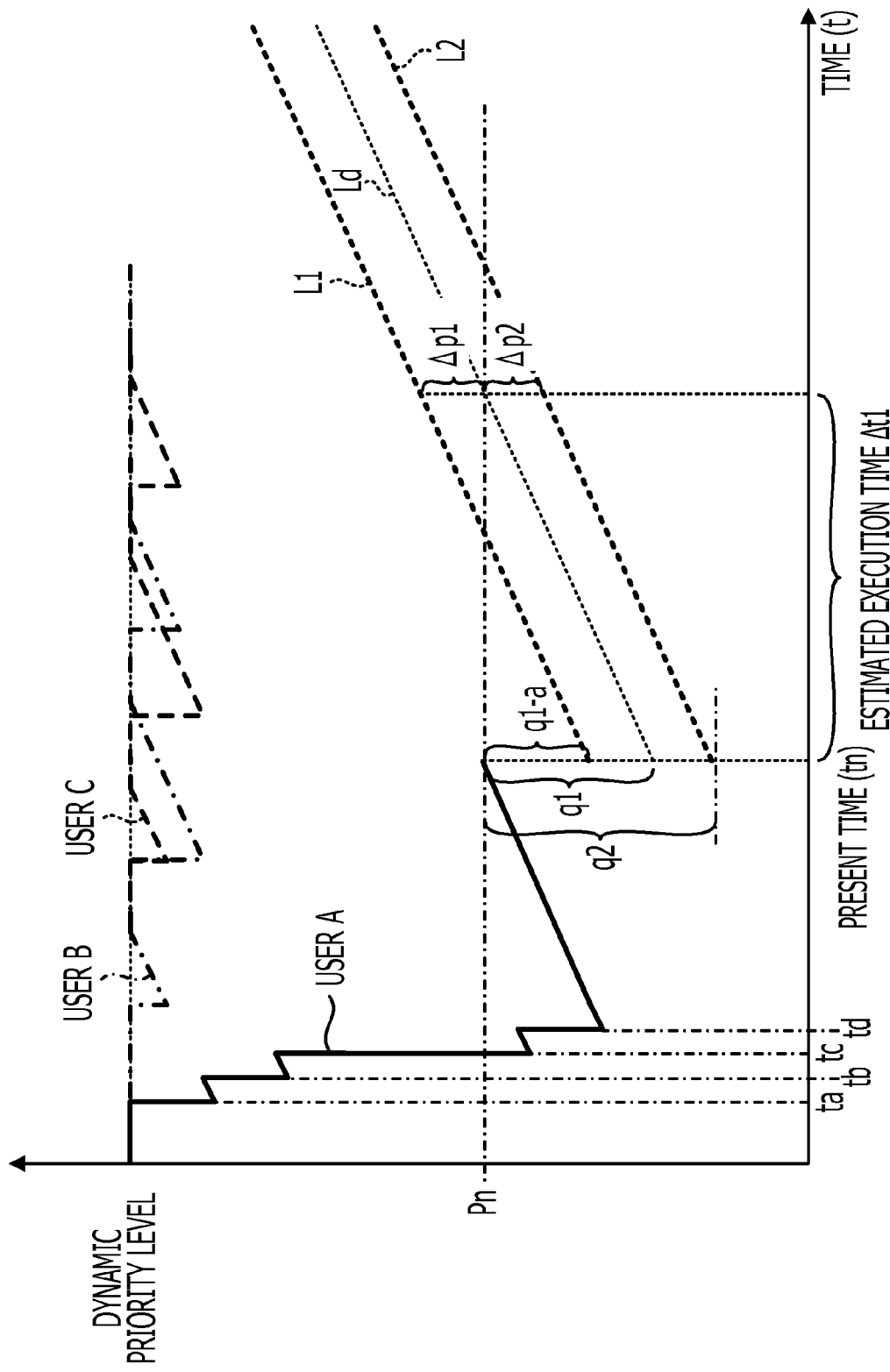
FIG. 5 is a graph illustrating an example of changes in priority levels that are controlled using a scheme for controlling priority levels in a first embodiment.

In the present embodiment, further, control illustrated in FIG. 5 is executed. FIG. 5 is a graph illustrating an example of changes in priority levels that are controlled using the scheme for controlling priority levels in the first embodiment.

Referring to FIG. 5, a value of the dynamic priority level of a user A at a present time to is denoted by Pn, and markedly decreases, compared with that of each of the other users (a user B, a user C, and so forth). The reason for this is that jobs associated with the user A were dispatched at times ta, tb, tc, and td, and so-called penalties are imposed on the user A.

In this state, in the present embodiment, if Relationship (1) given below is satisfied for a job of user A, a remedial action (an exceptional action) of enabling the job to be dispatched even in a case in which the job is a job associated with the user A is taken.

$$\text{the number of CPUs} \leq \text{a recovery rate} \quad (1)$$

Relationship (1) is equivalent to Relationship (2) as given below.

$$\text{an estimated utilization capacity} \leq \text{an estimated execution time} \times \text{a recovery rate} \quad (2)$$

The reason for this is that an estimated utilization capacity is represented by the expression of the number of CPUs×an estimated execution time. Accordingly, Relationship (2) can be transformed into Relationship (3) as given below.

$$\text{the number of CPUs} \times \text{an estimated execution time an estimated execution time} \times \text{a recovery rate} \quad (3)$$

When both of the sides of Relationship 3 are divided by the estimated execution time, Relationship (1) can be obtained.

In other words, in the present embodiment, regarding a job for which, if, at a future time, which is an estimated-execution-time period from the present time, a dynamic priority level is expected to recover so that the dynamic priority level is equal to or higher than the dynamic priority level at the present time, dispatching of the job is enabled regardless of the relative relationships with dynamic priority levels of the other users. Here, a job for which, if, at a future time, which is an estimated-execution-time period from the present time, a dynamic priority level is expected to recover so that the dynamic priority level is equal to or higher than the dynamic priority level at the present time corresponds to a job for which the amount of an increase in the dynamic priority level during the estimated execution time is equal to or smaller than the amount a reduction in the dynamic priority level that is caused by dispatching the job.

For example, when, in Relationship (2), a penalty (which is a reduction in the dynamic priority level that is caused by dispatching the job) imposed with consideration of an estimated utilization capacity is considered as a dept and an expression of an estimated execution time×a recovery rate is considered as an income that a user has until a job finishes, Relationship (2) means that the dept which is in a repayable range is admitted. In this manner, while the dynamic priority level of the user A is being prevented from falling into a negative spiral, a chance of being dispatched can be provided for a job associated with the user A. However, a condition in which the number of active jobs associated with the user A is equal to or smaller than a predetermined limit value (for example, zero) needs to be established. The reason for this is that duplication of the remedial action is admitted for a plurality of jobs, there is a possibility that the dynamic priority level cannot be prevented from falling into a negative spiral. Furthermore, the reason for this is that, in spite of the fact that the remedial action is an action affording a remedy, permission of execution of a large number of jobs is not appropriate in terms of maintaining fairness. In terms of fairness, it is preferable that the limit value of the number of active jobs be 0 (zero). However, the limit value may appropriately be determined in accordance with an operation.

Furthermore, a description below regarding the meaning of Relationship (1) can also be made. An estimated utilization capacity can be computed using the expression of the number of CPUs×an estimated execution time. Here, supposing that the unit of time of the estimated execution time is an "hour", penalties per hour indicate the number of CPUs. In contrast, it can be considered that the amount of recovery of the dynamic priority level during the estimated execution time is an amount of recovery from penalties during the estimated execution time. Here, the amount of recovery of the dynamic priority level during the estimated execution time is computed using the expression of an estimated execution time×a recovery rate. Accordingly, a recovery rate per hour indicates an amount of recovery from penalties per hour. Thus, the number of CPUs and the recovery rate can be directly compared with each other as in Relationship (1). In other words, if penalties per hour are equal to or smaller than the amount of recovery from penalties per hour, the dynamic priority level will not decrease so that the dynamic priority level is lower than the dynamic priority level at the present time after the estimated execution time elapses. Note that, the unit of time (unit time) associated with the recovery rate needs to coincide with the unit (unit time) of the estimated execution time.

FIG. 5 will be described by way of example. Regarding the user A illustrated in FIG. 5, when a job for which the estimated execution time is computed as $\Delta t1$ is submitted in a job queue at a present time tn, a broken line Ld is a branch line indicating whether or not the job can be dispatched. In other words, if a line indicating change in the dynamic priority level of the user A for a job is expected to overlap with the broken line Ld or expected to pass above the broken line Ld (on the side of a dotted line L1), dispatching of the job is enabled. In contrast, if the line indicating change in the dynamic priority level of the user A for a job is expected to pass below the broken line Ld, dispatching of the job is rejected. This means that, if a utilizable capacity for the job is in the range represented by a value q1, dispatching of the job is enabled. For example, when the utilizable capacity for the job is represented by a value q1-a, if the job is dispatched, the dynamic priority level of the user A will change as represented by the dotted line L1. As a result, when the estimated execution time $\Delta t1$ elapses, the value of the dynamic priority level of the user A will increase only by a value $\Delta p1$ from a dynamic priority level Pn at the present time tn. Accordingly, in this case, dispatching of the job is enabled. In contrast, when the utilizable capacity for the job is represented by a value q2, if the job is dispatched, the dynamic priority level of the user A will change as represented by a dotted line L2. As a result, when the estimated execution time $\Delta t1$ elapses, the value of the dynamic priority level of the user A decreases only by a value $\Delta p2$ from the dynamic priority level Pn at the present time tn. Accordingly, in this case, dispatching of the job is rejected.

Hereinafter, a process procedure that the job scheduling apparatus 10 executes in order to realize the above-described scheme and so forth will be described by way of examples.

Figure 6:
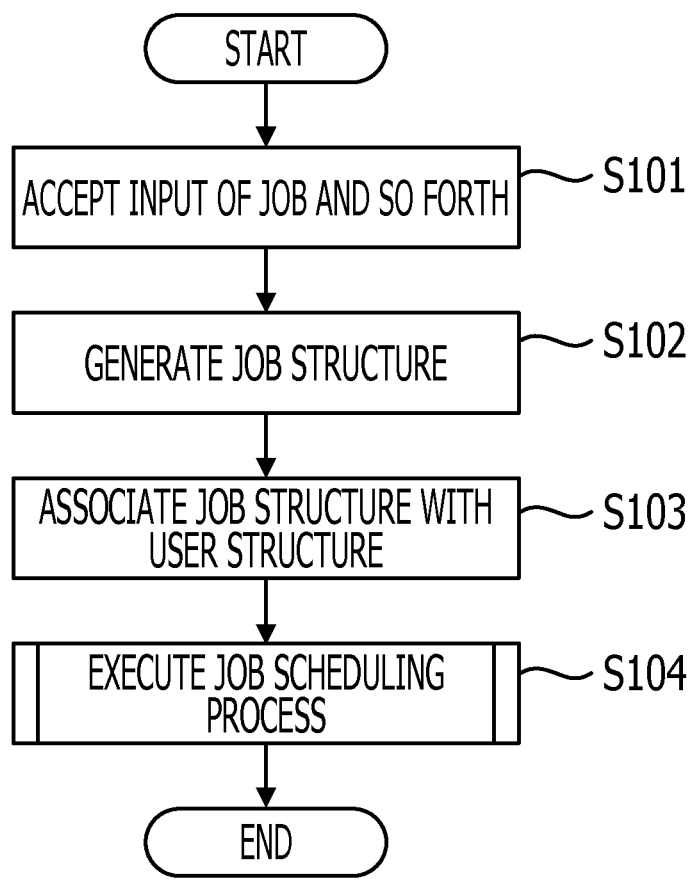
FIG. 6 is a flowchart for explaining a process procedure that is executed by the job scheduling apparatus when a job is submitted in the first embodiment.

FIG. 6 is a flowchart for explaining the process procedure that is executed by the job scheduling apparatus when a job is submitted in the first embodiment.

In S101, the job accepting unit 11 accepts, via the display device 106, the input device 107, or the like, submissions of a job, an identifier (a user identification (ID)) of a user who requests execution of the job, the number of CPUs, and an estimated execution time for the job. Furthermore, the priority level of the job may be submitted as necessary. The priority level of a job is different from the priority level (the static priority level or the dynamic priority level) of a user, where a job priority level is an indicator indicating relative merits of jobs associated with the same user. Note that, in the present embodiment, the substances of jobs are not particularly limited. A job may be a set of parameters for computation, or may be data including computational logic (a program).

After that, the job accepting unit 11 generates a job structure of the job in the memory 103. The job accepting unit 11 records a job ID of the job, the number of CPUs, the estimated execution time for the job, the priority level of the job, the present time, and so forth in the generated job structure (S102). Here, a job structure is data (a structure) for managing attribute information that is attributed to a job, and is generated for each job. Note that the present time is recorded as a time at which the job was submitted.

After that, the job accepting unit 11 associates the generated job structure with a user structure on the basis of the user ID (S103). A user structure is data (a structure) for managing attribute information (user information) associated with a user, and is generated in the memory 103 for each user at a predetermined time (for example, at a time at which the job scheduling apparatus 10 is activated) on the basis of user information that is perpetuated (stored) in the auxiliary storage device 102.

Figure 7:
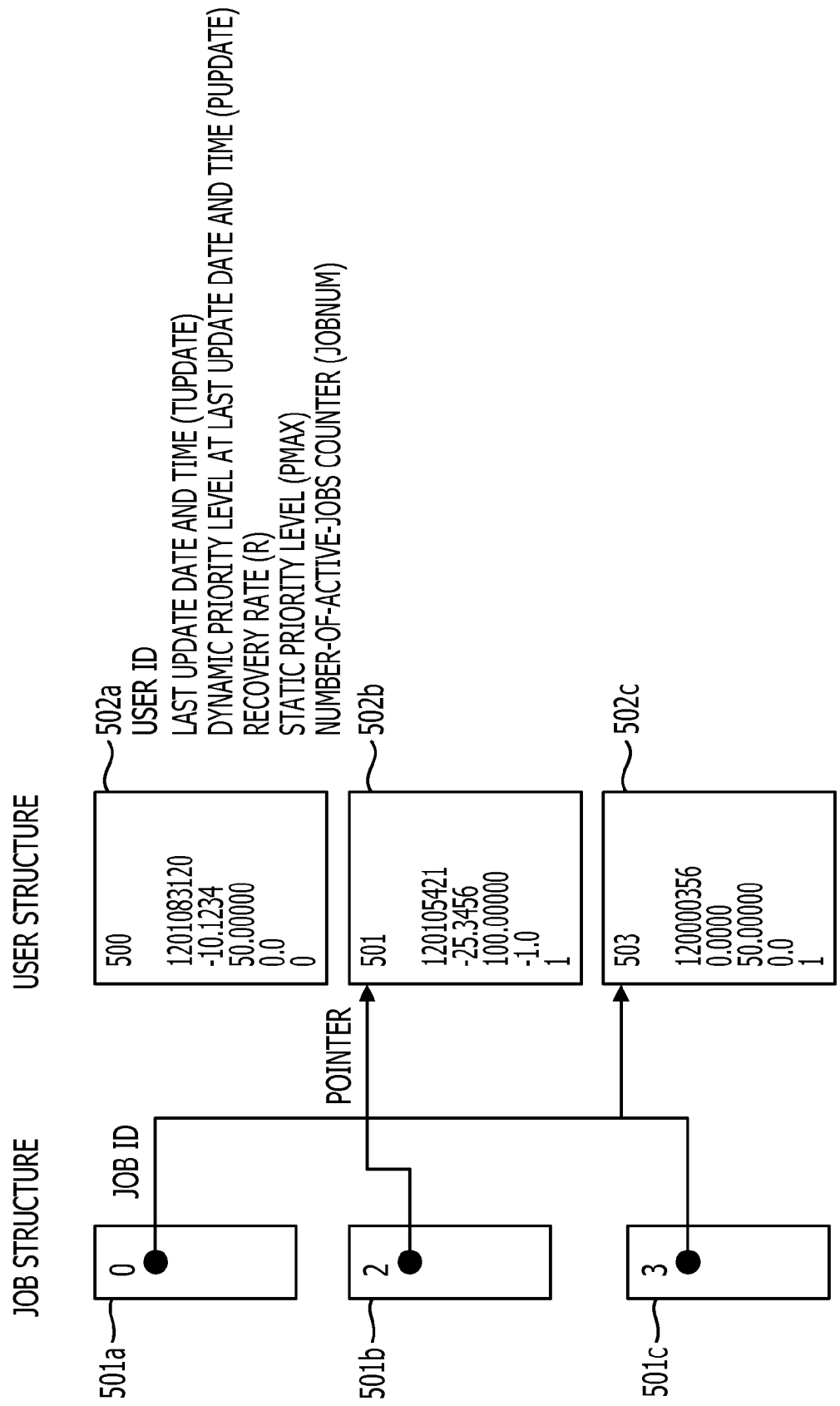
FIG. 7 is a diagram illustrating a state in which job structures and user structures are associated with each other.

FIG. 7 is a diagram illustrating a state in which job structures and user structures are associated with each other. In FIG. 7, job structures 501a, 501b, and 501c and user structures 502a, 502b, and 502c are illustrated.

By associating each of the job structures with a corresponding one of the user structures, a pointer (position information or identification information) pointing the associated user structure is registered in the job structure. Referring to FIG. 7, the job structures 501a and 501c are associated with the user structure 502c. The job structure 501b is associated with the user structure 502b. Note that the job IDs of the job structures 501a, 501b, and 501c are 0, 2, and 3, respectively.

A user structure has a user ID, a last update date and time ($t_{update}$), a dynamic priority level ($P_{update}$) at the last update date and time, a recovery rate (R), a static priority level ($P_{max}$), a number-of-active-jobs counter (JobNum), and so forth as member variables. The term "user ID" has a meaning the same as that of the above-described term "user ID". The last update date and time is a last date and time of the dynamic priority level. The dynamic priority level at the last update date and time is a dynamic priority level that was last computed in a scheduling process or the like. The recovery rate is a recovery rate for the dynamic priority level, and is computed on the basis of a utilizable capacity of the computational resource 20 per fixed time period. For example, the recovery rate is set to a value (a value that is obtained by dividing the utilizable capacity by the fixed time period) indicating that the dynamic priority level recovers only by the utilizable capacity of the computational resource 20 per fixed time period. However, the recovery rate may be corrected with consideration of other factors. Furthermore, a common value may be applied to recovery rates for all of the users. Note that the unit of time of the fixed time period is the same as the unit of an estimated execution time for a job. The static priority level is a static priority level of each user, and is handled as the maximum value of the dynamic priority level. The number-of-active-jobs counter indicates the number of active jobs associated with the user having the user ID. The term "active" refers to a state in which a job is dispatched to the computational resource 20, and in which a termination notification has not been received from the computational resource 20.

In S103, a pointer pointing the user structure having the user ID that has been submitted in S101 is registered in the job structure that has been generated in S102.

Next, the job scheduling apparatus 10 executes scheduling (determination of a dispatch order, which is the order in which the job is dispatched, dispatching of the job, and so forth) of the job using the job structure, the user structure, and so forth (S104).

Figure 8:
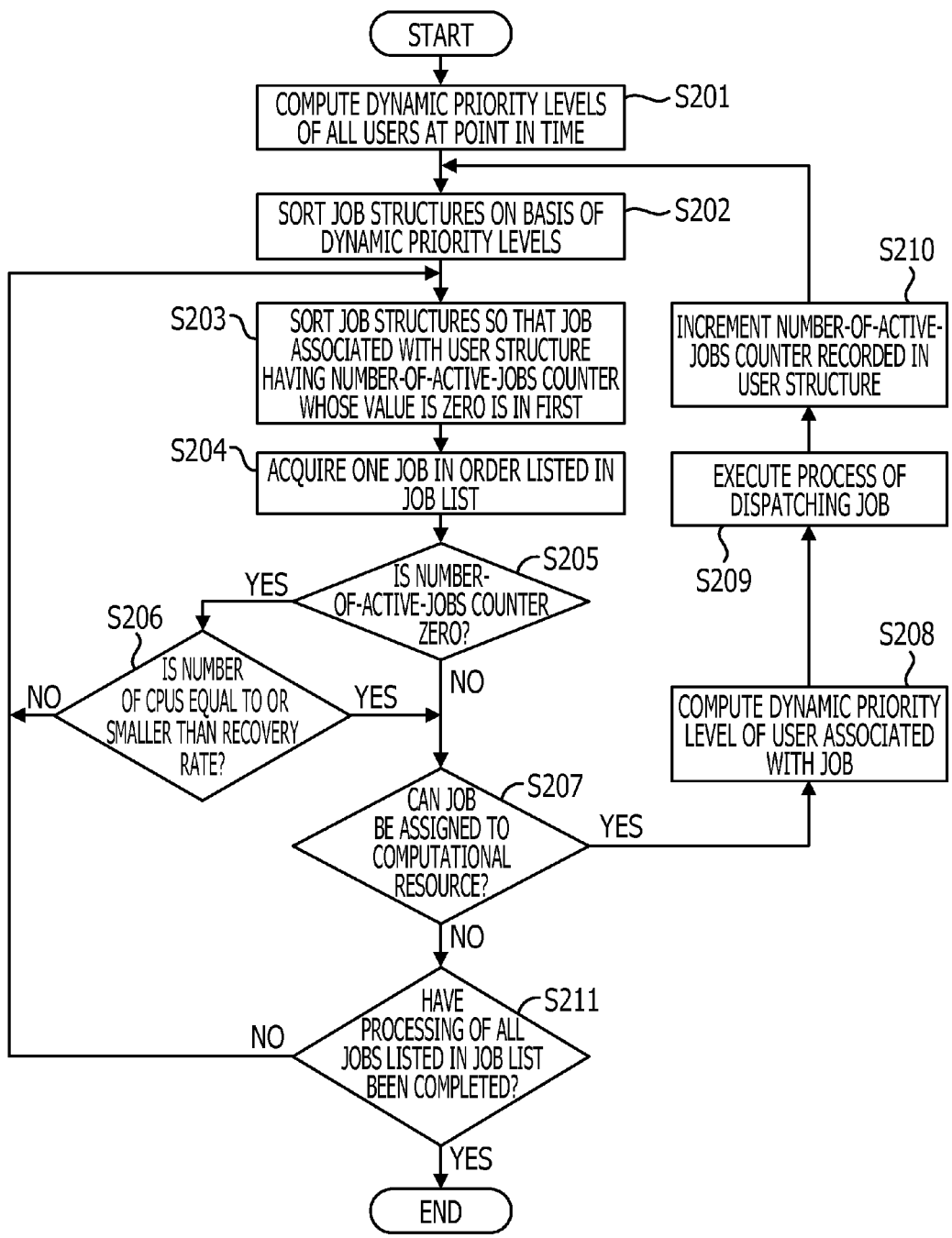
FIG. 8 is a flowchart for explaining a process procedure of a job scheduling process in the first embodiment.

The details of the process in S104 will be described. FIG. 8 is a flowchart for explaining a process procedure of a job scheduling process in the first embodiment. The process illustrated in FIG. 8 is not only executed at a time at which a job is submitted but also repeatedly executed (for example, periodically) at predetermined timing.

In S201, the priority computing unit 12 computes dynamic priority levels of all users at the present point in time on the basis of all user structures that have been loaded on the memory 103 (S201). Note that, here, the term "all users" refers to users who are considered as users of a computing system, and user information regarding the users is registered in advance in the job scheduling apparatus 10. The term "all users" is not limited only to users associated with jobs that have been submitted at the present point in time.

Here, supposing that $P_{now}$ denotes a dynamic priority level at the present point in time, $P_{update}$ denotes a dynamic priority level at the last update date and time, $P_{max}$ denotes a static priority level of each of the users, R denotes a recovery rate, $t_{now}$ denotes a present date and time, and $t_{update}$ denotes a last update date and time, the dynamic priority level $P_{now}$ is computed by executing computation given below. When a dynamic priority level $P_{tmp}$ is represented by an equation $P_{tmp}=P_{update}+R\times(t_{now}-t_{update})$, the dynamic priority level $P_{now}$ is computed using an equation $P_{now}=P_{tmp}$ (in a case in which a relationship $P_{tmp}<P_{max}$ is established) and using an equation $P_{now}=P_{max}$ (in a case in which a relationship $P_{tmp}\geq P_{max}$ is established).

In other words, basically, the dynamic priority level $P_{now}$ is a value that is obtained by adding a value corresponding to recovery with time, namely ($R\times(t_{now}-t_{update})$), to the dynamic priority level $P_{update}$ at the last update date and time. However, the maximum value of the dynamic priority level $P_{now}$ is the static priority level $P_{max}$ of each of the users. For execution of the above-described computation, values that are stored in the individual user structures are used as the parameters excluding the present date and time $t_{now}$. The present date and time $t_{now}$ is acquired by the timer 108.

Furthermore, the priority computing unit 12 updates the values of the member variables that are recorded in each of the user structures in accordance with computation of a corresponding one of the dynamic priority levels. For example, the present data and time is substituted into the last update date and time $t_{update}$, and the computed dynamic priority level is substituted into the dynamic priority level $P_{update}$ at the last update date and time. Note that the process of computing dynamic priority levels in S201 is a process for realizing linear recovery of the dynamic priority levels.

After that, the dispatch unit 13 sorts the individual job structures in the order (descending order) of decreasing the dynamic priority levels $P_{update}$ at the last update date and time that are recorded in the user structures associated with the individual job structures (S202). Regarding a plurality of jobs that are attributed to the same user (a plurality of job structures associated with the same user structure), an order may be determined on the basis of the priority levels of the jobs or times at which the jobs are submitted, which are recorded in the individual job structures. For example, a job to which a higher priority level is set takes precedence. When the priority levels of jobs coincide with each other, a job that is submitted at an earlier time takes precedence.

Figure 9:
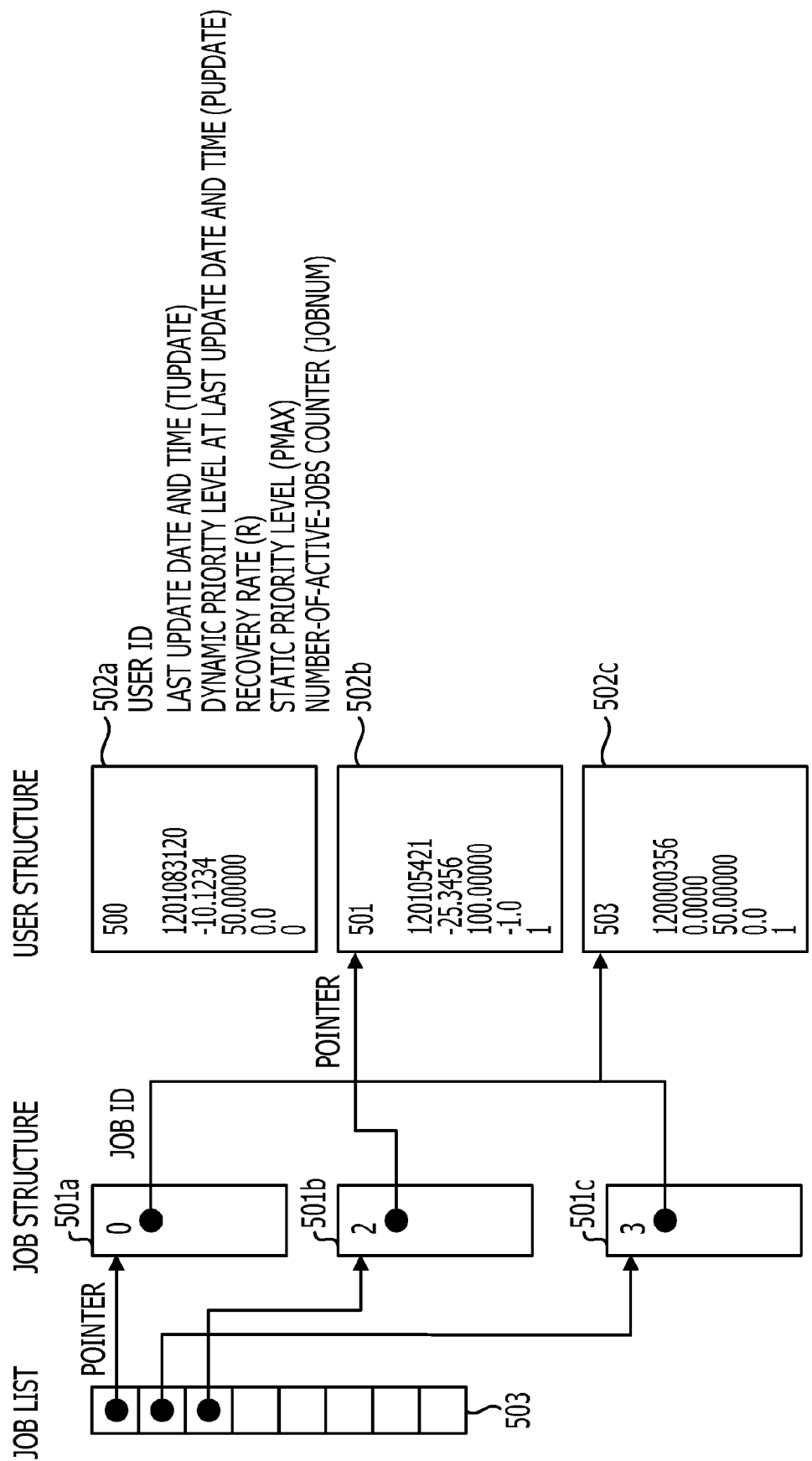
FIG. 9 is a diagram illustrating a data structure that is obtained as a result of sorting the job structures.

FIG. 9 is a diagram illustrating a data structure that is obtained as a result of sorting the job structures. As illustrated in FIG. 9, the result of sorting the job structures is registered in a job list 503. The job list 503 is a matrix of pointers pointing the job structures. In other words, the pointers pointing the job structures are registered in individual elements of the job list 503 in the order in which the job structures have been sorted. Referring to FIG. 9, pointers pointing the job structures 501a and 501c associated with the user structure 502c having the dynamic priority level $P_{update}$ at the last update date and time whose value is 0.0 are registered in the first and second elements of the job list 503. After that, a pointer pointing the job structure 501b associated with the user structure 502b having the dynamic priority level $P_{update}$ at the last update date and time whose value is −25.3456 is registered in the third element of the job list 503.

Note that, although the values of the member variables that are recorded in the user structures illustrated in FIG. 9 have not been updated with respect to the corresponding values illustrated in FIG. 7, this is for convenience.

After that, the dispatch unit 13 sorts the job structures so that the job structure associated with the user structure having the number-of-active-jobs counter JobNum whose value is zero is in first place, and reflects a sorting result in the job list 503 (S203). In other words, a job associated with a user who does not have any active job takes precedence. However, when no user structure having the number-of-active-jobs counter JobNum whose value is zero exists, the dispatch unit 13 may sort the job structures so that, among the job structures, a job structure associated with a user structure having the number-of-active-jobs counter JobNum whose value is equal to or smaller than a predetermined limit value is in first place. When a plurality of job structures concerned exist, a user structure having the number-of-active-jobs counter JobNum whose value is smaller may take precedence.

After that, the dispatch unit 13 determines one job structure as a reference target in the order that is registered in the job list 503, and acquires a job corresponding to the job structure (S204). Hereinafter, the job structure that is determined as a reference target is referred to as a "current job structure". Note that jobs waiting for being dispatched are recorded in the memory 103 or the auxiliary storage device 102 in association with job IDs. Accordingly, in S204, the dispatch unit 13 retrieves a job on the basis of the job ID recorded in the current job structure.

After that, the dispatch unit 13 determines whether or not the value of the number-of-active-jobs counter JobNum that is recorded in the user structure (hereinafter, referred to as a "current user structure") associated with the current job structure is zero (S205). In other words, regarding the user associated with the current job structure, whether or not none of jobs associated with the user is active is determined. However, as described with reference to FIG. 5, whether or not the value of the number-of-active-jobs counter JobNum is equal to or smaller than a predetermined limit value may be determined.

When the value of the number-of-active-jobs counter JobNum is zero (or equal to or smaller than the predetermined limit value) (Yes in S205), the dispatch unit 13 determines whether or not the number of CPUs recorded in the current job structure is equal to or smaller than the recovery rate R of the current user structure (S206). When the number of CPUs is larger than the recovery rate R (No in S206), the processes in S204 and thereafter are executed for the other job structures that have not been processed.

When the number of CPUs is equal to or smaller than the recovery rate R (Yes in S206), the dispatch unit 13 determines whether or not the retrieved job (a current job) can be assigned (dispatched) to the computational resource 20 (S207). The determination is executed on the basis of whether or not a free capacity corresponding to a capacity (the number of CPUs) necessary for the current job exists in the computational resource 20.

When a free capacity corresponding to a capacity necessary for the current job exists in the computational resource 20 (Yes in S207), the priority computing unit 12 updates the dynamic priority level $P_{update}$ of the user associated with the current job (S208). The updating is executed by computation given below. A value that is obtained using an expression $P_{update} - r \times T_{estimate}$ where $T_{estimate}$ denotes an estimated execution time and r denotes the number of CPUs is substituted into the dynamic priority level $P_{update}$.

Here, an expression ($r \times T_{estimate}$) corresponds to an estimated utilization capacity. In other words, a reduction in the dynamic priority level (a penalty) at a time at which a job starts (at a time at which a job is dispatched) is realized by the updating. Note that a value recorded in the user structure associated with the job structure of the current job is used as the value of the dynamic priority level $P_{update}$ for the computation. Values recorded in the job structure of the current job are used as the number r of CPUs and the estimated execution time $T_{estimate}$. Furthermore, the dynamic priority level $P_{update}$ recorded in the user structure of the user associated with the current job is updated using the dynamic priority level that is obtained as a computation result. The last update date and time $t_{update}$ is updated using a date and time at which the current job is to start (is to be dispatched).

After that, the dispatch unit 13 dispatches the current job to the computational resource 20 (S209). Accordingly, the current job is executed by the computational resource 20 to which the current job has been dispatched. Note that, when the current job is dispatched, the dispatch unit 13 records the date and time at which the current job starts in the job structure of the current job. After that, the dispatch unit 13 adds one to the number-of-active-jobs counter JobNum recorded in the current user structure (S210). After that, the processes in S202 and thereafter are repeated.

In contrast, when no free capacity corresponding to a capacity necessary for the current job exists in the computational resource 20 (No in S207), the dispatch unit 13 determines whether or not all of the job structures that are registered in the job list 503 have been processed (S211). When a job structure that has not been processed exists (No in S211), the processes in S204 and thereafter are executed on the job structure that has not been processed. When processing of all of the job structures has been completed (Yes in S211), the dispatch unit 13 terminates the job scheduling process.

Note that, when it is determined in S207 that the current job cannot be dispatched to the computational resource 20, the dispatch unit 13 may wait until dispatching of the current job is enabled (until a free capacity of the CPUs corresponding to the number of CPUs necessary for the current job is available).

Figure 10:
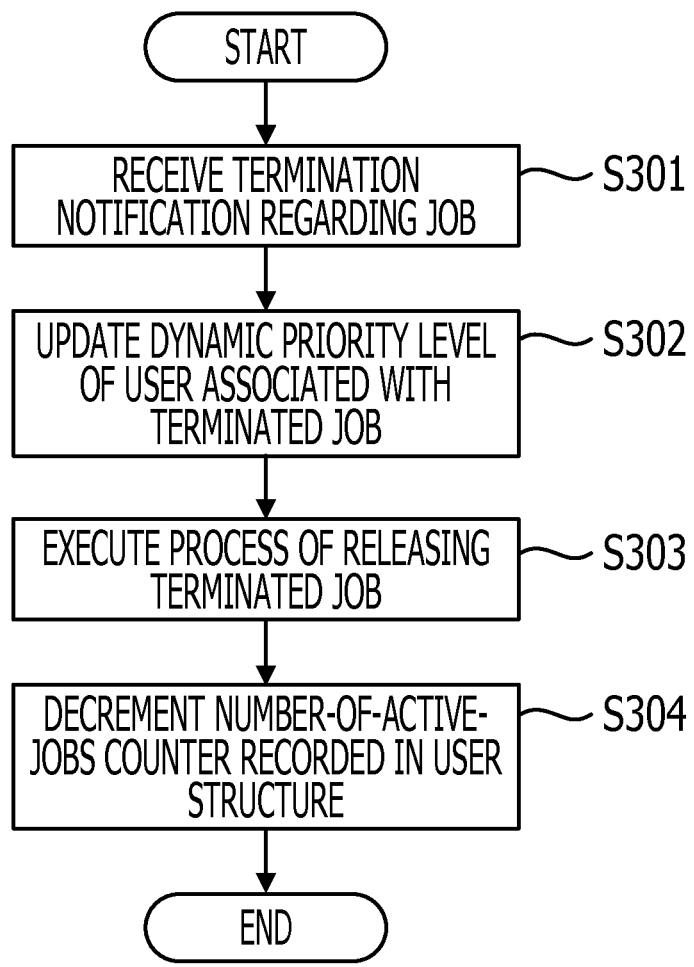
FIG. 10 is a flowchart for explaining a process procedure that is executed by the job scheduling apparatus when a job finishes in the first embodiment.

After that, a process that is executed when execution of a job finishes will be described. FIG. 10 is a flowchart for explaining a process procedure that is executed by the job scheduling apparatus when a job has finished in the first embodiment.

When a job has finished, a notification of a job ID of the job that has finished (terminated job) is provided by the computational resource 20 that has executed the job. In S301, the job-termination-notification accepting unit 14 of the job scheduling apparatus 10 receives the notification. After that, the priority computing unit 12 updates the dynamic priority level $P_{update}$ of a user associated with the terminated job (S302). The updating is executed by computation given below. A value that is obtained using an expression $P_{update} + r \times (T_{estimate} - T_{actual})$ where $T_{actual}$ denotes an actual execution time is substituted into the dynamic priority level $P_{update}$.

Here, an expression ($r \times T_{actual}$) corresponds to an actual utilization capacity. In other words, updating of the dynamic priority level $P_{update}$ in S301 is executed in order to correct the dynamic priority level using the difference between an estimated utilization capacity, which is considered as a penalty that was imposed when the job started, and a utilization capacity (the actual utilization capacity) of a computational resource that was actually utilized. Compensation for the difference between the estimated utilization capacity and the actual utilization capacity can be made by the above-described correction, and the dynamic priority level can be controlled more fairly.

Note that a value recorded in the user structure (the current user structure) associated with the job structure having the job ID of the terminated job is used as the value of the dynamic priority level $P_{update}$ for computation. Values recorded in the job structure are used as the number r of CPUs and the estimated execution time $T_{estimate}$. The actual execution time is computed on the basis of a date and time at which the job started and a date and time at which a termination notification regarding the job was received, which are recorded in the job structure. Furthermore, the dynamic priority level $P_{update}$ recorded in the current user structure is updated using the dynamic priority level that is obtained as a computation result, and the last update date and time $t_{update}$ is updated using the date and time at which a termination notification regarding the job was received.

After that, the job release unit 15 executes a process of releasing the terminated job (S303). For example, the job structure associated with the terminated job is deleted from the memory 103. Furthermore, the pointer pointing the terminated job registered in the job list 503 is deleted.

After that, the job release unit 15 subtracts one from the number-of-active-jobs counter JobNum recorded in the current job structure (S304).

With the above-described processes, the scheme for controlling dynamic priority levels in the present embodiment, which is described with reference to FIG. 5, is realized.

As described above, in the first embodiment, when over-utilization of the computational resource 20 temporarily occurs and the dynamic priority level of a user markedly decreases, even a job associated with the user can be made to be targeted for being dispatched by applying the remedial action. A chance for being executed can appropriately be provided for a job.

As a result, regarding the user whose dynamic priority level markedly decreases, a state in which a job associated with the user is not executed at all for a long time can be prevented from occurring.

Furthermore, a job that is to be targeted for the remedial action is limited in accordance with the relationships between the job and a recovery rate for the user. Accordingly, the fairness between the user and the other users is appropriately maintained (the correctness of fair sharing is maintained), and a state in which reduction in the dynamic priority level of the user cannot be stopped can be prevented from occurring.

Figure 11:
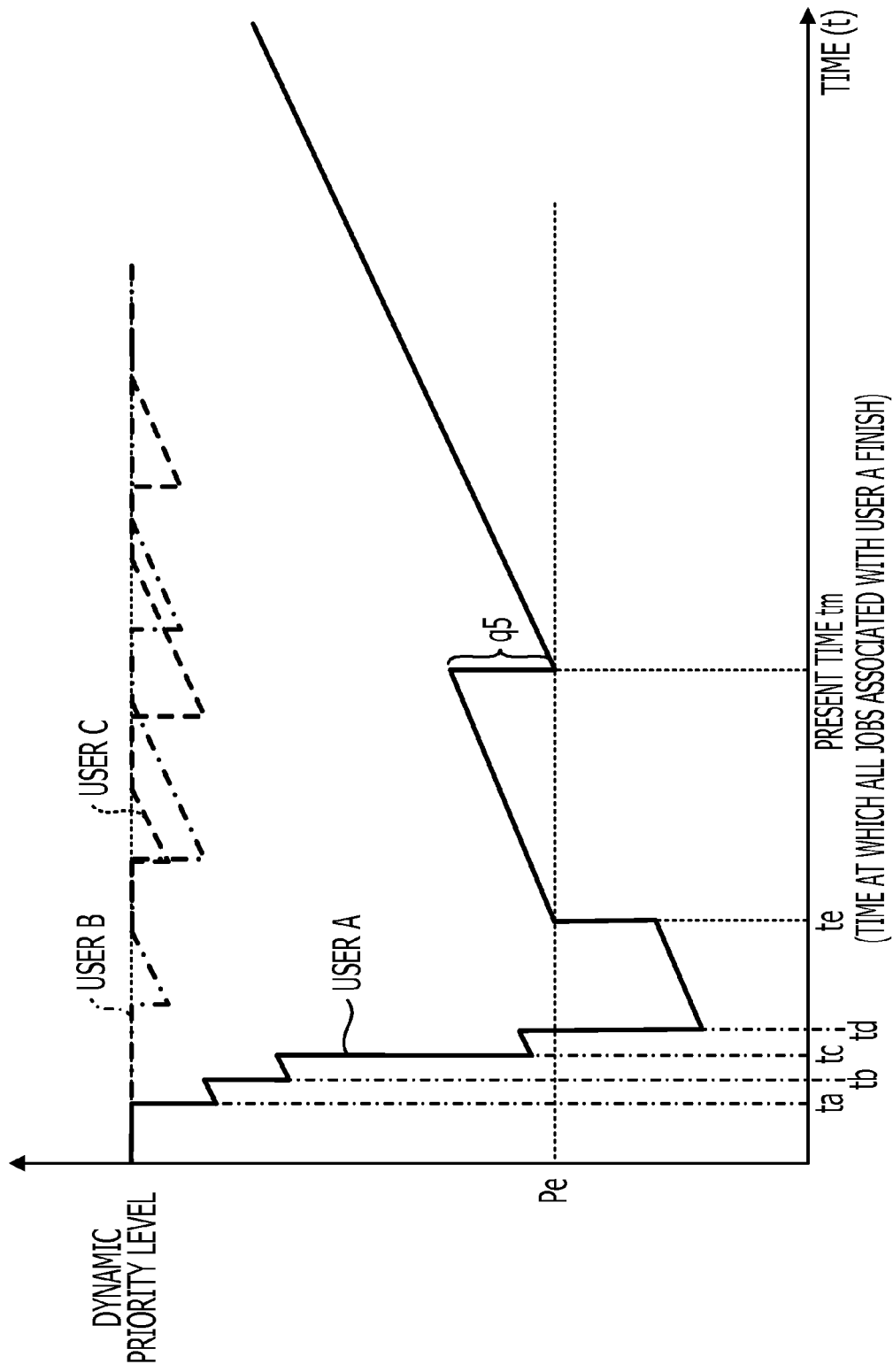
FIG. 11 is a graph illustrating an example of changes in priority levels that are controlled using a scheme for controlling priority levels in a second embodiment.

Next, a second embodiment will be described. FIG. 11 is a diagram illustrating an example of changes in priority levels that are controlled using a scheme for controlling priority levels in the second embodiment. In FIG. 11, elements that are the same as those illustrated in FIG. 5 are denoted by the same reference numerals, and a description thereof is omitted. Furthermore, respects in which description is not particularly made in the second embodiment may be similar to those in the first embodiment.

In FIG. 11, a time to is a time at which execution of all jobs associated with the user A finishes. The sentence "execution of all jobs finishes" does not mean that execution of all of the jobs simultaneously finishes. In other words, the time te is a time at which no active job associated with the user A is left. Note that the dynamic priority level of the user A increases at the time te. This phenomenon is caused by the above-described correction based on the difference between an estimated utilization capacity and an actual utilization capacity.

In the second embodiment, regarding the user A, after no active job is left, when the dynamic priority level recovers only by an estimated utilization capacity for the next job, a remedial action of enabling the next job to be dispatched regardless of the relative relationships between the dynamic priority level of the user A and the dynamic priority levels of the other users is taken. The clause "when the dynamic priority level recovers only by an estimated utilization capacity for the next job" means that a penalty is imposed on the dynamic priority level when a job is dispatched and, then, the dynamic priority level can be maintained so that the dynamic priority level is equal to or higher than a dynamic priority level Pe at the time te. In other words, if the dynamic priority level is reduced when a job starts and the amount of the reduction in the dynamic priority level is expected to be equal to or smaller than the amount of an increase in the dynamic priority level in the time period from the time te to a time at which execution of the next job starts (a time at which the job is dispatched), dispatching of the job as the next job is enabled regardless of the relationships between the dynamic priority level of the user A and the dynamic priority levels of the other users.

For example, referring to FIG. 11, regarding the user A, the dynamic priority level increases by a value q5 in the time period from the time te to the present time tm. Accordingly, if the job is a job for which an estimated utilization capacity is expected to be equal to or lower than the value q5, dispatching of the job is enabled.

In this manner, as in the first embodiment, while the dynamic priority level of the user A is being prevented from falling into a negative spiral, a chance of being dispatched can be provided for a job associated with the user A. Furthermore, a condition in which no active job associated with the user A exists is automatically determined as a condition for application of the remedial action. Accordingly, a possibility that the dynamic priority level of the user A cannot be prevented from falling into a negative spiral can be reduced. Moreover, the fairness between the user and the other users is also appropriately maintained. Note that the time to illustrated in FIG. 11 may be a point in time when the number of active jobs associated with the user A becomes equal to or smaller than a predetermined limit value. In this case, the condition for application of the remedial action is that the number of active jobs associated with the user A is equal to or smaller than a predetermined limit value.

Hereinafter, a process procedure that the job scheduling apparatus 10 executes in order to realize the above-described scheme will be described by way of example.

Figure 12:
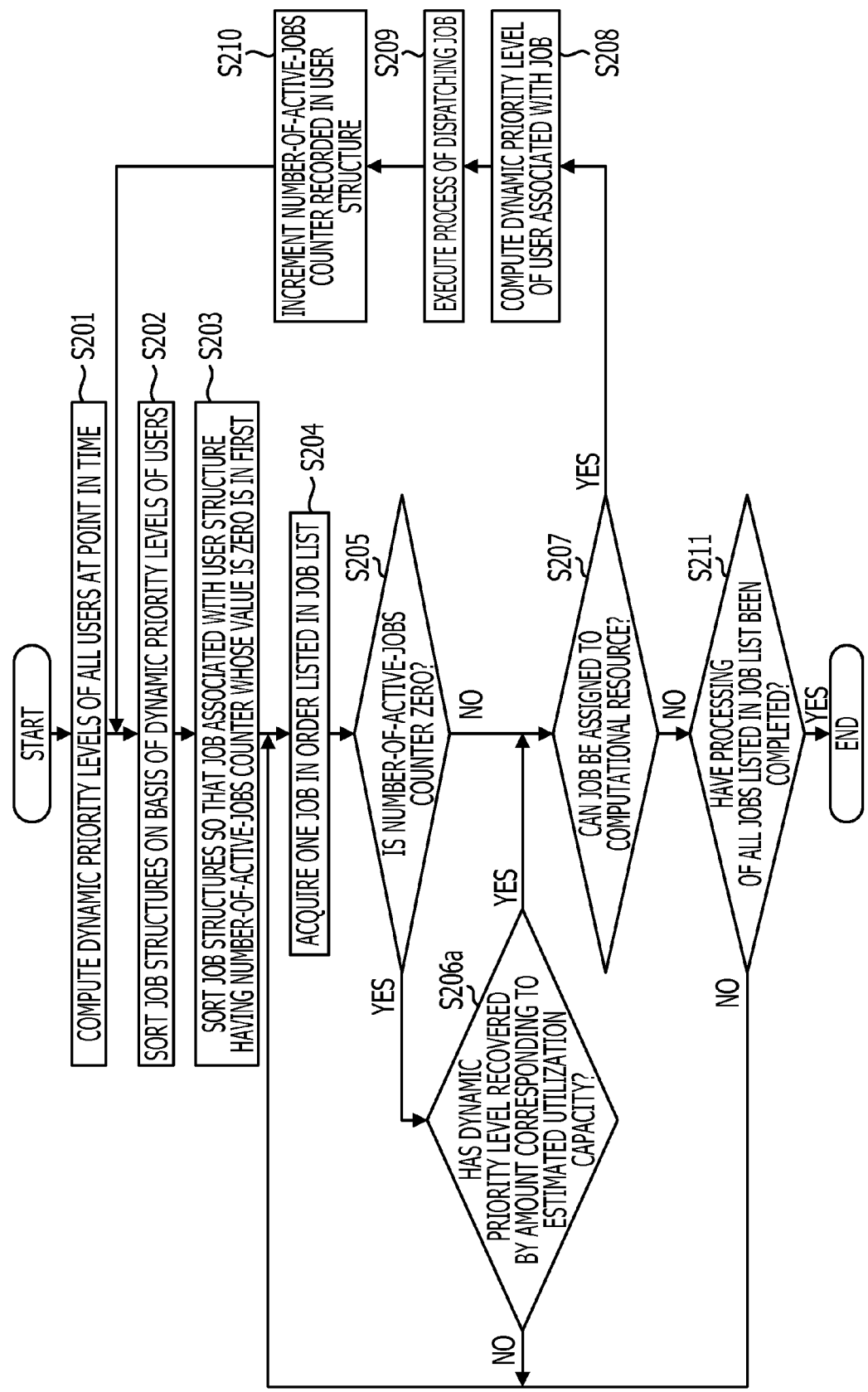
FIG. 12 is a flowchart for explaining a process procedure of a job scheduling process in the second embodiment.

FIG. 12 is a flowchart for explaining a process procedure of a job scheduling process in the second embodiment. In FIG. 12, operations that are the same as those illustrated in FIG. 8 are denoted by the same numerals, and a description thereof is omitted.

In FIG. 12, S206 illustrated in FIG. 8 is replaced with S206a. In S206a, the dispatch unit 13 determines whether or not the dynamic priority level of the current user has recovered by a predetermined amount from the dynamic priority level at a point in time when the number of active jobs belonging to the current user associated with the current user structure becomes zero (or at a point in time when the number of active jobs belonging to the current user becomes equal to or lower than a predetermined limit value). Here, the predetermined amount corresponds to an estimated utilization capacity for the job associated with the current job structure.

The dynamic priority level at a point in time when the number of active jobs belonging to the current user becomes zero or becomes equal to or smaller than the predetermined limit value is the dynamic priority level $P_{update}$ at the last update date and time recorded in the current user structure. Operations in which the dynamic priority level $P_{update}$ is updated are S201 and S208, and S302 illustrated in FIG. 10. The reason for this is that the value of the dynamic priority level $P_{update}$ recorded in the current user structure in a state in which a standby job exists and in which the number of active jobs becomes zero or becomes equal to or smaller than the predetermined limit value is recorded in S302 illustrated in FIG. 10.

Accordingly, a method for calculating the dynamic priority level $P_{now}$ of the current user at the present point in time may be the same as the method employed in S201. The amount of recovery of the dynamic priority level that has recovered from the dynamic priority level at a point in time when the number of active jobs becomes zero or becomes equal to or smaller than the predetermined limit value is calculated by an expression of the dynamic priority level $P_{now}$ at the present point in time−the dynamic priority level $P_{update}$ recorded in the current user structure. In contrast, the estimated utilization capacity for the job associated with the current job structure is calculated by the expression of the number of CPUs×an estimated execution time. The number of CPUs and the estimated execution time are recorded in the current job structure. Accordingly, in S206a, whether or not a relationship in which the number of CPUs×the estimated execution time the dynamic priority level $P_{now}$ at the present point in time $P_{now}$−the dynamic priority level $P_{update}$ recorded in the current user structure is established is determined.

When the dynamic priority level of the current user has recovered by the predetermined amount (Yes in S206a), the processes in S207 and thereafter are executed. When the dynamic priority level of the current user has not recovered by the predetermined amount (No in S206a), the processes in S204 and thereafter are executed for the other job structures that have not been processed.

As described above, also in the second embodiment, effects that are similar to those in the first embodiment can be obtained.

According to an aspect of the embodiments of the invention, any combinations of one or more of the described features, functions, operations, and/or benefits can be provided. A combination can be one or a plurality. The embodiments can be implemented as an apparatus (a machine) that includes computing hardware (i.e., computing apparatus), such as (in a non-limiting example) any computer that can store, retrieve, process and/or output data and/or communicate (network) with other computers. According to an aspect of an embodiment, the described features, functions, operations, and/or benefits can be implemented by and/or use computing hardware and/or software executed by computing hardware. An aspect of an embodiment relates to causing one or more apparatuses and/or computer processors to execute the described functions. The program/software implementing the embodiments may be transmitted over a transmission communication path, e.g., a wire and/or a wireless network implemented via hardware. An example of communication media via which the program/software may be sent includes, for example, a carrier-wave signal.

The embodiments of the present invention are described above. However, the present invention is not limited to such particular embodiments. Various changes and modifications may be made without departing from the gist of the present invention described in Claims. All examples and conditional language recited herein are intended for pedagogical objects to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A computer-readable, non-transitory medium storing therein a job scheduling program that causes a computer to execute a procedure, the procedure comprising:
   determining an assignment order, which is an order in which jobs of users are assigned to a computational resource, based upon priority levels of the users associated with the jobs;
   assigning the jobs to the computational resource based upon the assignment order;
   reducing a priority level of a user in response to a job of the user that has been assigned to the computational resource; and
   increasing the priority level of the user with time,
   wherein, in the assigning of the jobs, regarding the priority level of the user, if, at a future time, which is a fixed time period from start of execution of jobs of the user, an amount of an increase in the priority level of the user is expected to be equal to or larger than an amount of a reduction in the priority level of the user for another job, assignment of the another job of the user to the computational resource is executed.

2. The computer-readable, non-transitory medium according to claim 1,
   wherein when a number of the jobs that are associated with the user and that have been assigned to the computational resource is equal to or smaller than a predetermined value, if an amount of a reduction in the priority level of the user for a job is expected to be equal to or smaller than an amount of an increase in the priority level of the user, assignment of the job to the computational resource is executed.

3. The computer-readable, non-transitory according to claim 1,
   wherein, in the reducing, the priority level of the user is reduced based upon a number of central processing units that execute the job of the user and estimated execution time for the job of the user,
   wherein, in the increasing, the priority level of the user is increased with time based upon a recovery rate for the priority level of the user, and
   wherein, in the assigning of the jobs, if the number of central processing units that execute a job of the user is expected to be equal to or lower than the recovery rate, assignment of the job of the user to the computational resource is executed.

4. The computer-readable, non-transitory medium according to claim 1, wherein, in the assigning of the jobs, regarding a user among the users, in a case in which a number of jobs that are associated with the user and that have been assigned to the computational resource is zero, assignment of a job associated with the user to the computational resource is executed.

5. A computer-readable, non-transitory medium storing therein a job scheduling program that causes a computer to execute a procedure, the procedure comprising:
   determining an assignment order, which is an order in which jobs that have been accepted from users are assigned to a computational resource, based upon priority levels of the users associated with the jobs;
   assigning the jobs to the computational resource based upon the assignment order;
   reducing the priority levels of the users that are associated with the jobs that have been assigned to the computational resource; and
   increasing the priority levels of the users with time,
   wherein, in the assigning of the jobs, regarding a user among the users, in a case in which a number of jobs that are associated with the user and that have been assigned to the computational resource is equal to or smaller than a predetermined value, if an amount of a reduction in a priority level of the user for a job is expected to be equal to or smaller than an amount of an increase in the priority level of the user, assignment of the job to the computational resource is executed.

6. A job scheduling system comprising:
   an assignment means for determining an assignment order, which is an order in which jobs of users are assigned to a computational resource, based upon priority levels of the users associated with the assignment order, and for assigning the jobs to the computational resource based upon the assignment order; and
   a priority computing means for reducing a priority level of a user in response to a job of the user that has been assigned to the computational resource, and for increasing the priority level of the user with time,
   wherein, regarding the priority level of the user, if, at a future time, which is a fixed time period from start of execution of jobs of the user, an amount of an increase in the priority level of the user is expected to be equal to or larger than an amount of a reduction in the priority level of the user for other job, the assignment means executes assignment of the other job of the user to the computational resource.

7. The job scheduling apparatus according to claim 6,
   wherein the assignment means, when a number of the jobs that are associated with the user and that have been assigned to the computational resource is equal to or smaller than a predetermined value, if an amount of a reduction in the priority level of the user for a job is expected to be equal to or smaller than an amount of an increase in the priority level of the user, executes assignment of the job to the computational resource.

8. The job scheduling apparatus according to claim 6,
   wherein, regarding the users associated with the jobs that have been assigned to the computational resource, the priority computing means reduces the priority level of the user based upon a number of central processing units that execute the job of the user and estimated execution time for the job of the user, and increases the priority level of the user with time based upon a recovery rate for the priority level of the user, and wherein, if the number of central processing units that execute a job of the user is expected to be equal to or lower than the recovery rate, the assignment means executes assignment of the job of the user to the computational resource.

9. The job scheduling apparatus according to claim 6, wherein, regarding a user among the users, in a case in which a number of jobs that are associated with the user and that have been assigned to the computational resource is zero, the assignment means executes assignment of a job associated with the user to the computational resource.

10. A job scheduling apparatus comprising:
a processor configured to execute a procedure, the procedure comprising:
determining an assignment order, which is an order in which jobs of users are assigned to a computational resource, based upon priority levels of the users associated with the jobs;
assigning the jobs to the computational resource based upon the assignment order;
reducing a priority level of a user in response to a job of the user that has been assigned to the computational resource; and
increasing the priority level of the user with time,
wherein, in the assigning of the jobs, regarding the priority level of the user, if, at a future time, which is a fixed time period from start of execution of jobs of the user, an amount of an increase in the priority level of the user is expected to be equal to or larger than an amount of a reduction in the priority level of the user for another job, assignment of the another job of the user to the computational resource is executed.

11. A scheduling system comprising:
assignment means for determining an assignment order, which is an order in which jobs that have been accepted from users are assigned to a computational resource, based upon priority levels of the users associated with the jobs, and for assigning the jobs to the computational resource based upon the assignment order; and
priority computing means for reducing the priority levels of the users that are associated with the jobs that have been assigned to the computational resource, and for increasing the priority levels of the users with time,
wherein, regarding a user among the users, in a case in which a number of jobs that are associated with the user and that have been assigned to the computational resource is equal to or smaller than a predetermined value, if an amount of a reduction in a priority level of the user for a job is expected to be equal to or smaller than an amount of an increase in the priority level of the user, the assignment means executes assignment of the job of the user to the computational resource.

12. A scheduling apparatus comprising:
a processor configured to execute a procedure, the procedure comprising:
determining an assignment order, which is an order in which jobs that have been accepted from users are assigned to a computational resource, based upon priority levels of the users associated with the jobs;
assigning the jobs to the computational resource based upon the assignment order;
reducing the priority levels of the users that are associated with the jobs that have been assigned to the computational resource; and
increasing the priority levels of the users with time,
wherein, in the assigning of the jobs, regarding a user among the users, in a case in which a number of the jobs that are associated with the user and that have been assigned to the computational resource is equal to or smaller than a predetermined value, if an amount of a reduction in a priority level of the user for a job is expected to be equal to or smaller than an amount of an increase in the priority level of the user, assignment of the job to the computational resource is executed.

13. A job scheduling method executed by a computer, the job scheduling method comprising:
determining an assignment order, which is an order in which jobs of user are assigned to a computational resource, based upon priority levels of the users associated with the jobs;
assigning the jobs to the computational resource based upon the assignment order;
reducing a priority level of a user in response to a job of the user that has been assigned to the computational resource; and
increasing a priority level of the user with time,
wherein, in the assigning of the jobs, regarding the priority level of the user, if, at a future time, which is a fixed time period from the start of execution of jobs of the user, an amount of an increase in the priority level of the user is expected to be equal to or larger than an amount of a reduction in the priority level of the user for another job, assignment of the another job of the user to the computational resource is executed.

14. The job scheduling method according to claim 13, wherein when a number of the jobs that are associated with the user and that have been assigned to the computational resource is equal to or smaller than a predetermined value, if an amount of a reduction in the priority level of the user for a job is expected to be equal to or smaller than an amount of an increase in the priority level of the user, assignment of the job to the computational resource is executed.

15. The job scheduling method according to claim 13,
wherein, in the reducing, the priority level of the user is reduced based upon a number of central processing units that execute the job of the user and estimated execution time for the job of the user,
wherein, in the increasing, the priority level of the user is increased with time based upon a recovery rate for the priority level of the user, and
wherein, in the assigning of the jobs, if the number of central processing units that execute a job of the user is expected to equal to or lower than the recovery rate, assignment of the job to the computational resource is executed.

16. The job scheduling method according to claim 13, wherein, in the assigning of the jobs, regarding a user among the users, in a case in which a number of jobs that are associated with the user and that have been assigned to the computational resource is zero, assignment of a job associated with the user to the computational resource is executed.

17. A job scheduling method executed by a computer, the job scheduling method comprising:
determining an assignment order, which is an order in which jobs that have been accepted from users are assigned to a computational resource, based upon priority levels of the users associated with the jobs;
assigning the jobs to the computational resource based upon the assignment order;

reducing the priority levels of the users that are associated with the jobs that have been assigned to the computational resource; and increasing the priority levels of the users with time, wherein, in the assigning of the jobs, regarding a user among the users, in a case in which a number of jobs that are associated with the user and that have been assigned to the computational resource is equal to or smaller than a predetermined value, if an amount of a reduction in a priority level of the user for a job is expected to be equal to or smaller than an amount of an increase in the priority level of the user, assignment of the job to the computational resource is executed.

\* \* \* \* \*

UNITED STATES PATENT AND TRADEMARK OFFICE
CERTIFICATE OF CORRECTION

| | |
|---|---|
| PATENT NO. | : 8,539,495 B2 |
| APPLICATION NO. | : 13/018917 |
| DATED | : September 17, 2013 |
| INVENTOR(S) | : Yoshifumi Ujibashi et al. |

It is certified that error appears in the above-identified patent and that said Letters Patent is hereby corrected as shown below:

In the Claims:

In Column 15, Line 57, In Claim 3, after "non-transitory" insert -- medium --.

Signed and Sealed this
Eighteenth Day of February, 2014

Michelle K. Lee
*Deputy Director of the United States Patent and Trademark Office*